(12) United States Patent
Inomata (10) Patent No.: US 8,963,854 B2
(45) Date of Patent: Feb. 24, 2015

(54) DATA PROCESSING DEVICE, AND COMPUTER PROGRAM AND DATA PROCESSING METHOD THEREOF

(75) Inventor: Masayoshi Inomata, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 13/256,579

(22) PCT Filed: Mar. 15, 2010

(86) PCT No.: PCT/JP2010/001831
§ 371 (c)(1),
(2), (4) Date: Sep. 14, 2011

(87) PCT Pub. No.: WO2010/119611
PCT Pub. Date: Oct. 21, 2010

(65) Prior Publication Data
US 2012/0019470 A1    Jan. 26, 2012

(30) Foreign Application Priority Data
Apr. 13, 2009  (JP) .................................. 2009-096979

(51) Int. Cl.
G06F 3/041 (2006.01)
G06F 3/0482 (2013.01)
G06F 3/0481 (2013.01)
G06F 3/0488 (2013.01)
H04M 1/725 (2006.01)

(52) U.S. Cl.
CPC .......... *G06F 3/0482* (2013.01); *G06F 3/04817* (2013.01); *G06F 3/04886* (2013.01); *H04M 1/72583* (2013.01); *H04M 2250/22* (2013.01)
USPC ............ 345/173; 715/763; 715/764; 715/841

(58) Field of Classification Search
USPC .......... 345/173–179; 715/763, 764, 713, 779, 715/810, 825, 829, 841
See application file for complete search history.

(56) References Cited

U.S. PATENT DOCUMENTS

| 5,926,178 A | 7/1999 | Kurtenbach |
| 2003/0081016 A1* | 5/2003 | Rahimzadeh et al. ........ 345/864 |

(Continued)

FOREIGN PATENT DOCUMENTS

| CN | 101404687 A | 4/2009 |
| JP | 2001215943 A | 8/2001 |

(Continued)

OTHER PUBLICATIONS

Chinese Office Action for CN Application No. 201080016610.0 issued on Jun. 5, 2013 with English Translation.

(Continued)

*Primary Examiner* — Premal Patel
(74) *Attorney, Agent, or Firm* — Sughrue Mion, PLLC (57) ABSTRACT

A calling and display unit displays the image of a function calling icon (FCI) on at least one of the four corners of a screen of a touch panel. An icon calling unit calls function activation icons (FAI) in correspondence to a touch manipulation on the FCI. A function display unit displays the images of the called FAIs so as to be arranged on at least one of the four sides of the screen, which communicates with one of the four corners where the FCI is located. Therefore, the proportion in which the images of the displayed FAIs obstruct a display image displayed on the screen can be minimized. In this way, a data processing device minimizes the proportion in which the images of the FAIs displayed on the touch panel obstruct the display image.

11 Claims, 8 Drawing Sheets

(56) References Cited

U.S. PATENT DOCUMENTS

| | | |
|---|---|---|
| 2003/0169302 A1 | 9/2003 | Davidsson et al. |
| 2004/0070629 A1* | 4/2004 | Seifert .................... 345/810 |
| 2005/0143124 A1* | 6/2005 | Kennedy et al. .......... 455/556.1 |
| 2006/0218503 A1 | 9/2006 | Matthews et al. |
| 2007/0089069 A1* | 4/2007 | Hsieh et al. ................. 715/810 |
| 2007/0101296 A1* | 5/2007 | Won et al. .................... 715/841 |
| 2007/0106950 A1* | 5/2007 | Hutchinson et al. ......... 715/761 |

FOREIGN PATENT DOCUMENTS

| | | |
|---|---|---|
| JP | 2002-55752 A | 2/2002 |
| JP | 2003298715 A | 10/2003 |
| JP | 2003-312373 A | 11/2003 |
| JP | 2005-99403 A | 4/2005 |
| JP | 2007181993 A | 7/2007 |
| JP | 2008535052 A | 8/2008 |
| KR | 10-0682723 B1 | 2/2007 |
| WO | 01/96994 A2 | 12/2001 |

OTHER PUBLICATIONS

Korean Office Action for KR Application No. 10-2011-7022616 issued on Oct. 30, 2013 with Partial English Translation.

Japanese Office Action for JP Application No. 2011-509185 mailed on Dec. 10, 2013 with partial English Translation.

The Extended European Search Report for EP Application No. 10764198.7 dated on Mar. 24, 2014.

\* cited by examiner

DATA PROCESSING DEVICE, AND COMPUTER PROGRAM AND DATA PROCESSING METHOD THEREOF

TECHNICAL FIELD

The present invention relates to a data processing device used for processing various kinds of data, and more particularly, to a data processing device that executes an image display operation and a touch manipulation with a touch panel, and a computer program and a data processing method thereof.

BACKGROUND ART

At present, in particular, in a data processing device such as a mobile personal digital assistant (PDA) or a mobile phone terminal, a touch panel capable of executing an image display operation and a touch manipulation is widely used. Various data processing devices using such a touch panel have been proposed.

For example, an invention that provides a manipulation display unit including a touch panel or the like which has multiple functions but is easy for users to manipulate, a manipulation displaying method, and a manipulation displaying program has already been filed.

The data processing device is a manipulation display unit that displays the icons and keys of an image forming apparatus and receives the settings of operation conditions through manipulations from the user. The data processing device includes a touch panel for displaying icons and the like, in which a basic screen for displaying predetermined icons and the like and a simple screen for displaying a smaller number of icons and the like than predetermined operation condition items displayed on the basic screen are interchangeably displayed on the touch panel (for example, see Patent Document 1).

Moreover, an invention that enables users to easily call a function setting menu, for example, and performs function settings smoothly and quickly while effectively using a display screen has already been filed. In the data processing device, a control unit displays a dial lock/secret mode setting notifying icon and the like on an upper border region of a display screen while a standby screen is displayed in a main display region and displays a vibrator setting notifying icon and the like on a lower border region of the display screen.

When a user manipulates a cursor key, selects the vibrator setting notifying icon, for example, and presses an OK key, the control unit displays a vibrator setting menu on the main display region.

Here, when the user manipulates the cursor key and selects OFF, for example, and presses the OK key, the control unit rewrites the setting contents stored in a storage unit (for example, see Patent Document 2).

RELATED DOCUMENT

Patent Document

[Patent Document 1] JP-A-2007-181993
[Patent Document 2] JP-A-2003-298715

DISCLOSURE OF THE INVENTION

However, in the data processing devices of the related art, in order to enable users to easily use a specific function, the image of a function activation icon associated with the function is displayed on a screen of a touch panel.

Moreover, in particular, in a small touch panel or the like of a mobile data processing device, when the images of a number of function activation icons are displayed in advance on the screen thereof, the images may obstruct the display image associated with various processes.

The present invention has been made in view of the above problems, and provides a data processing device capable of allowing users to use a plurality of function activation icons quickly and easily to thereby minimize obstruction of the display image associated with various processes, and a computer program and a data processing method thereof.

A data processing device of the present invention includes: a touch panel that includes a rectangular screen which has a function of displaying images and a function of accepting a touch manipulation; an icon storage unit that stores a plurality of function activation icons each for activating a predetermined function by the touch manipulation and a function calling icon for calling the plurality of function activation icons by the touch manipulation; a call display unit that displays the image of the stored function calling icon on at least one of the four corners of the screen of the touch panel; a function calling unit that calls the plurality of function activation icons in correspondence to a touch manipulation on the image of the displayed function calling icon; and a function display unit that displays the images of the plurality of called function activation icons so as to be arranged on at least one of the four sides of the screen, which communicates with one of the four corners where the function calling icon is located.

A computer program of the present invention is a computer program of the data processing device of the present invention which causes the data processing device to execute: an icon storage process of storing a plurality of function activation icons each for activating a predetermined function by the touch manipulation and a function calling icon for calling the plurality of function activation icons by the touch manipulation; a call display process of displaying the image of the stored function calling icon on at least one of the four corners of the screen of the touch panel; a function calling process of calling the plurality of function activation icons in correspondence to a touch manipulation on the image of the displayed function calling icon; and a function display process of displaying the images of the plurality of called function activation icons so as to be arranged on at least one of the four sides of the screen, which communicates with one of the four corners where the function calling icon is located.

A data processing method of the present invention is a data processing method of the data processing device of the present invention which includes: an icon storage operation of storing a plurality of function activation icons each for activating a predetermined function by the touch manipulation and a function calling icon for calling the plurality of function activation icons by the touch manipulation; a call display operation of displaying the image of the stored function calling icon on at least one of the four corners of the screen of the touch panel; a function calling operation of calling the plurality of function activation icons in correspondence to a touch manipulation on the image of the displayed function calling icon; and a function display operation of displaying the images of the plurality of called function activation icons so as to be arranged on at least one of the four sides of the screen, which communicates with one of the four corners where the function calling icon is located.

Various kinds of constituent elements of the present invention may be formed so as to realize the functions thereof. For example, the constituent elements can be realized as dedicated hardware that performs predetermined functions, a data processing device which is provided with predetermined functions by a computer program, and predetermined functions which are realized in a data processing device by a computer program, and an arbitrary combination thereof.

Moreover, various kinds of constituent elements of the present invention may not always be individually independent elements, but a plurality of constituent elements may be formed as a single member, a single constituent element may be formed as a plurality of members, a certain constituent element may be a part of the other constituent elements, and a part of a certain constituent element may overlap with a part of the other constituent elements.

Moreover, although the computer program and the data processing method of the present invention are described as a sequence of a plurality of processes and operations, the described sequence does not limit the sequence of executing the plurality of processes and the plurality of operations.

Therefore, when performing the computer program and the data processing method of the present invention, the sequence of the plurality of processes and the plurality of operations may be changed unless contrary to the content thereof.

In addition, in the computer program and the data processing method according to the present invention, the plurality of processes and the plurality of operations are not limited to being individually executed at different timings. Thus, another process and operation may occur during execution of a certain process and operation, and another process and operation may occur partially or entirely at the same timing as a certain process and operation.

In addition, "store data" as used in the present invention means that the data processing device of the present invention at least has a function of storing data. Thus, the data processing device of the present invention may allow storing data which is newly registered by a consumer, and may allow storing data which is registered during manufacturing by a supplier but may not allow new data to be registered by the consumer after the shipment.

In addition, although the up, down, left, and right directions are defined in the present invention, the directions are defined for the sake of convenience in order to simplify the relative relationship between constituent elements, and the directions do not restrict the directions when manufacturing or using the product in which the present invention is implemented.

Moreover, the data processing device as used in the present invention can be implemented as hardware constructed by general-purpose devices such as a central processing unit (CPU), a read only memory (ROM), a random access memory (RAM), or an interface (I/F) unit so as to read a computer program to execute a corresponding processing operation, a dedicated logic circuit constructed so as to execute a predetermined processing operation, and a combination thereof.

In the present invention, causing the data processing device to execute various operations corresponding to the computer program means causing the data processing device to control the operation of various kinds of devices.

In the data processing device of the present invention, a touch panel including a rectangular screen has a function of displaying images and a function of accepting a touch manipulation. An icon storage unit stores a plurality of function activation icons each for activating a predetermined function by the touch manipulation and a function calling icon for calling the plurality of function activation icons by the touch manipulation. A call display unit displays the image of the stored function calling icon on at least one of the four corners of the screen of the touch panel. A function calling unit calls the plurality of function activation icons in correspondence to a touch manipulation on the image of the displayed function calling icon. A function display unit displays the images of the plurality of called function activation icons so as to be arranged on at least one of the four sides of the screen, which communicates with one of the four corners where the function calling icon is located. Therefore, it is possible to minimize the proportion in which the images of the plurality of displayed function activation icons obstruct the display image displayed on the screen.

BRIEF DESCRIPTION OF DRAWINGS

The above and other objects, features, and advantages will be more apparent from the following description of certain preferred embodiments taken in conjunction with the accompanying drawings, in which.

DESCRIPTION OF EMBODIMENTS

An embodiment of the present invention will be described with reference to the drawings. In the present embodiment, the front, rear, left, right, and up, and down directions are defined as shown in the drawings. However, the directions are defined for the sake of convenience in order to simplify the relative relationship between constituent elements. Thus, the directions do not restrict the directions when manufacturing or using the product that implements the present invention.

Figure 1:
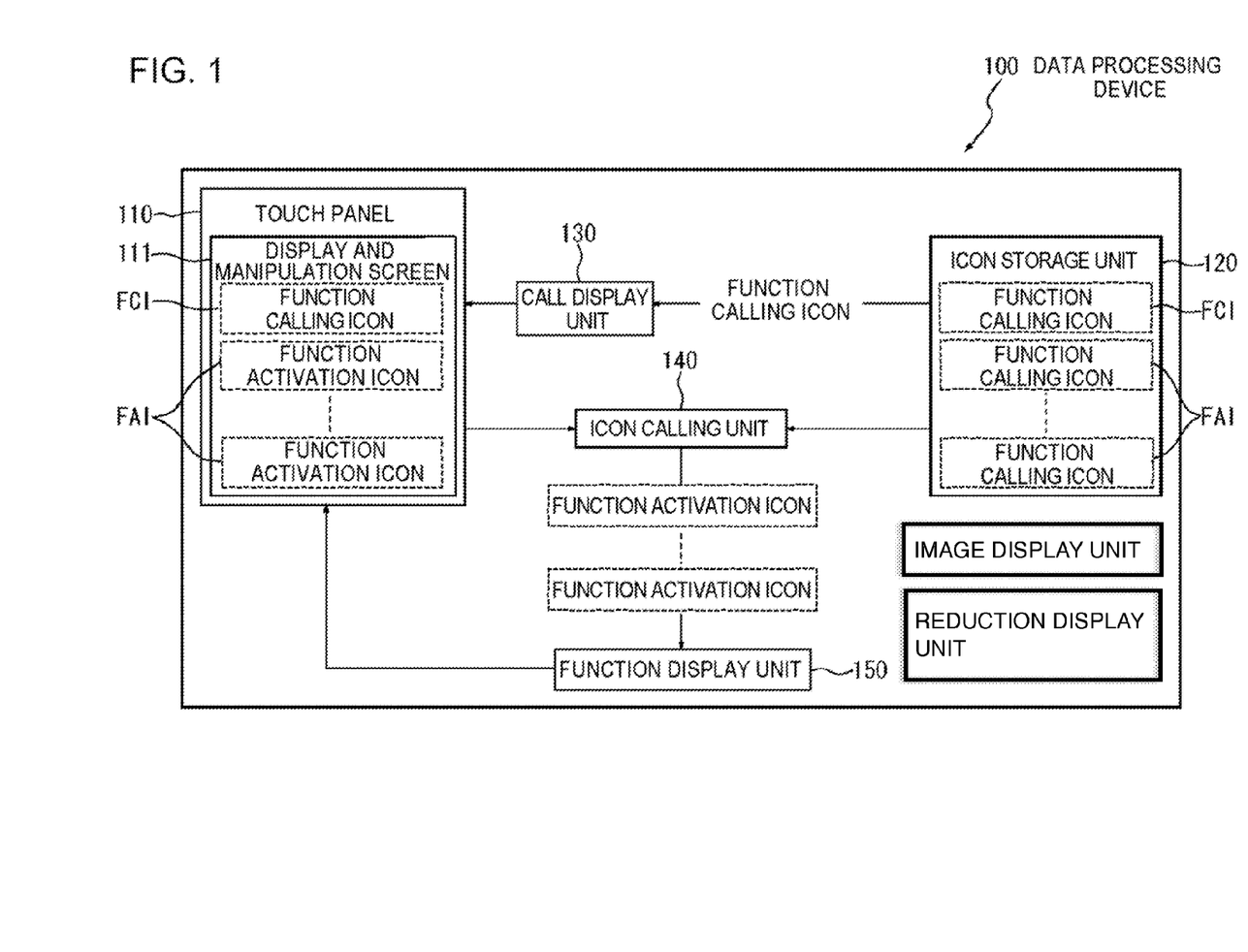
FIG. 1 is a schematic block diagram showing a logic structure of a data processing system according to an embodiment of the present invention.
Figure 2:
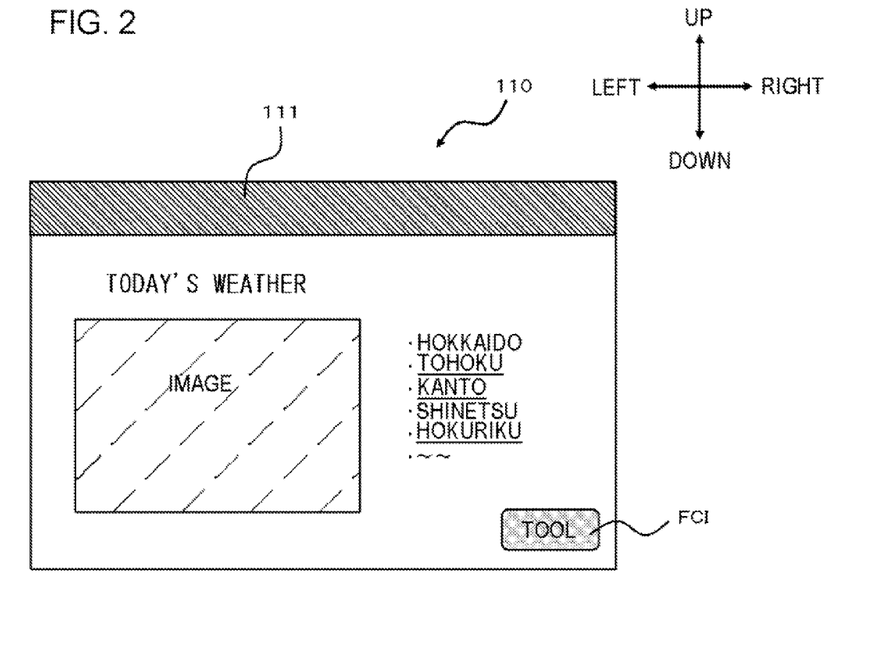
FIG. 2 is a schematic front view showing a state where a display image associated with various processes and the image of a function calling icon are displayed on a screen of a touch panel.
Figure 3:
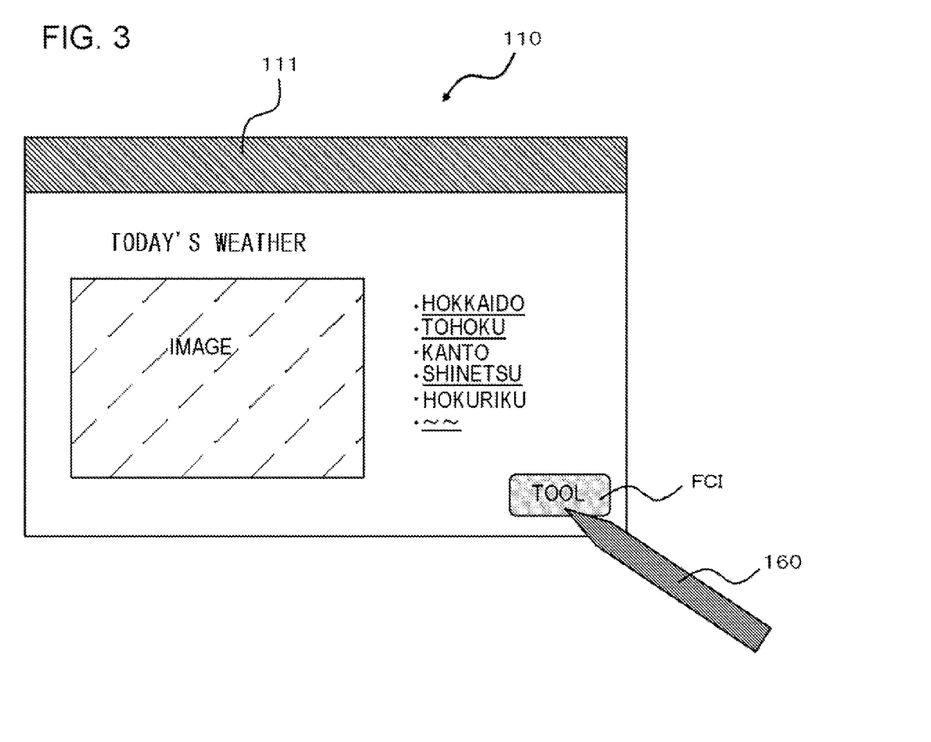
FIG. 3 is a schematic front view showing a state where the image of the function calling icon displayed on the screen of the touch panel is touched.
Figure 4:
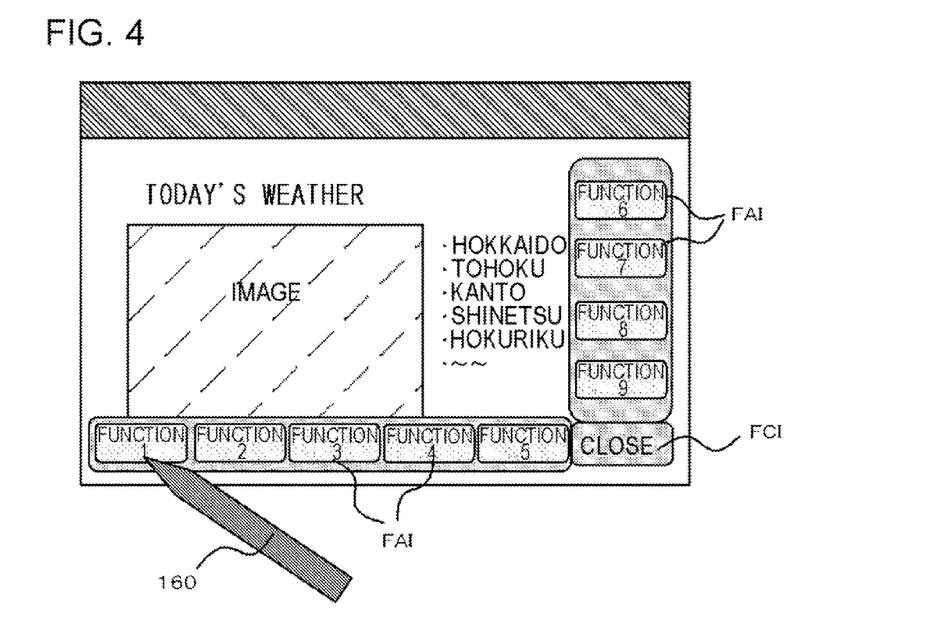
FIG. 4 is a schematic front view showing a state where the images of a plurality of function activation icons are displayed on the screen of the touch panel and one of them is touched.
Figure 5:
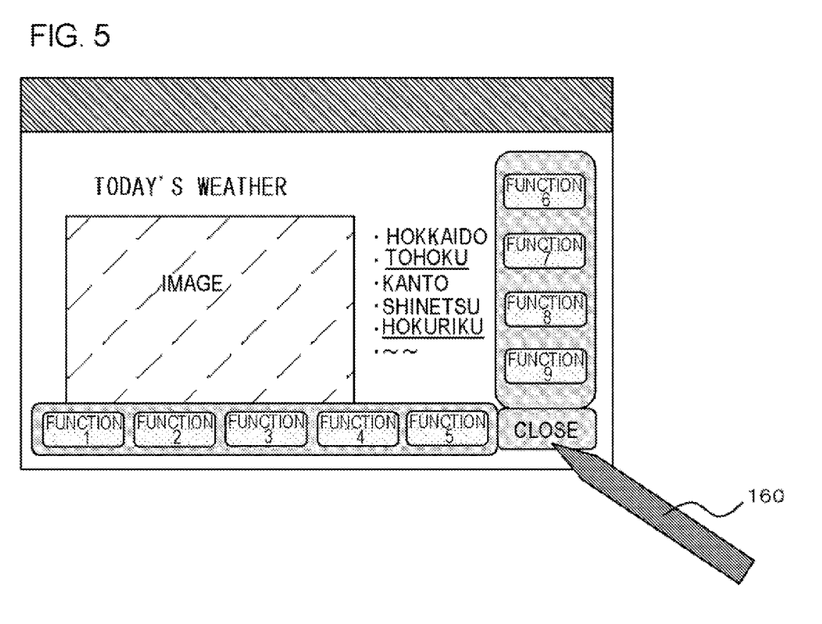
FIG. 5 is a schematic front view showing a state where the function calling icon is touched in a state where the images of the plurality of function activation icons are displayed on the screen of the touch panel.

As shown in FIG. 1, a data processing device 100 of the present embodiment includes a touch panel 110 that includes a rectangular screen 111 which has a function of displaying images and a function of accepting a touch manipulation, and an icon storage unit 120 that stores a plurality of function activation icons FAI each for activating a predetermined function by the touch manipulation and a function calling icon FCI for calling the plurality of function activation icons by the touch manipulation. As shown in FIGS. 2 and 3, the data processing device 100 includes a call display unit 130 that displays the image of the stored function calling icon FCI on at least one of the four corners of the screen 111 of the touch panel 110, and an icon calling unit 140 that calls the plurality of function activation icons FAI in correspondence to a touch manipulation on the image of the displayed function calling icon FCI. As shown in FIGS. 4 and 5, the data processing device 100 includes a function display unit 150 that displays the images of the plurality of called function activation icons FAI so as to be arranged on at least one of the four sides of the screen 111, which communicates with one of the four corners where the function calling icon FCI is located.

More specifically, as shown in FIGS. 4 and 5, the function display unit 150 displays the images of the plurality of function activation icons FAI so as to be arranged on two of the four sides which communicate with one of the four corners where the function calling icon FCI is located.

Moreover, the icon storage unit 120 stores the function calling icon FCI which is displayed as an image in a predetermined vertical height and horizontal width. The function display unit 150 displays the images of the plurality of function activation icons FAI so as to be arranged on one of the four sides, which communicates in a vertical direction with the same horizontal width as the function calling icon FCI with one of the four corners where the function calling icon FCI is located, and displays the images of the plurality of function activation icons FAI so as to be arranged on one of the four sides, which communicates in a horizontal direction with the same vertical height as the function calling icon FCI.

In addition, the icon storage unit 120 stores the function calling icon FCI of which the display image is changed before and after the images of the function activation icons are displayed, which will be described in detail later.

More specifically, the data processing device 100 of the present embodiment is formed as a mobile electronic terminal such as, for example, a mobile telephone terminal, a personal digital assistance (PDA), or an electronic dictionary.

Therefore, in order to reduce the size of a whole body and realize multiple functions, a touch manipulation is enabled in the touch panel 110 that displays images. The data processing device 100 of the present embodiment includes a stylus 160 as shown in FIG. 3 and the like, for example, in order to enable an accurate touch manipulation on the small-size touch panel 110.

The data processing device 100 of the present embodiment includes a computer unit, a memory device, and the like as hardware (not shown) in addition to the touch panel 110 and the like described above. A computer program is installed in the computer unit, and the computer unit controls the touch panel 110 and the like in an integrated manner in correspondence to the computer program, whereby the respective units as described above are logically realized as various kinds of functions.

The computer program of such a data processing device 100 is described so as to cause the data processing device 100 to execute, for example: an icon storage process of storing a plurality of function activation icons FAI each for activating a predetermined function by the touch manipulation and a function calling icon FCI for calling the plurality of function activation icons FAI by the touch manipulation; a call display process of displaying the image of the stored function calling icon FCI on at least one of the four corners of the screen 111 of the touch panel 110; a function calling process of calling the plurality of function activation icons FAI in correspondence to a touch manipulation on the image of the displayed function calling icon FCI; and a function display process of displaying the images of the plurality of called function activation icons FAI so as to be arranged on at least one of the four sides of the screen 111, which communicates with one of the four corners where the function calling icon FCI is located.

Figure 6:
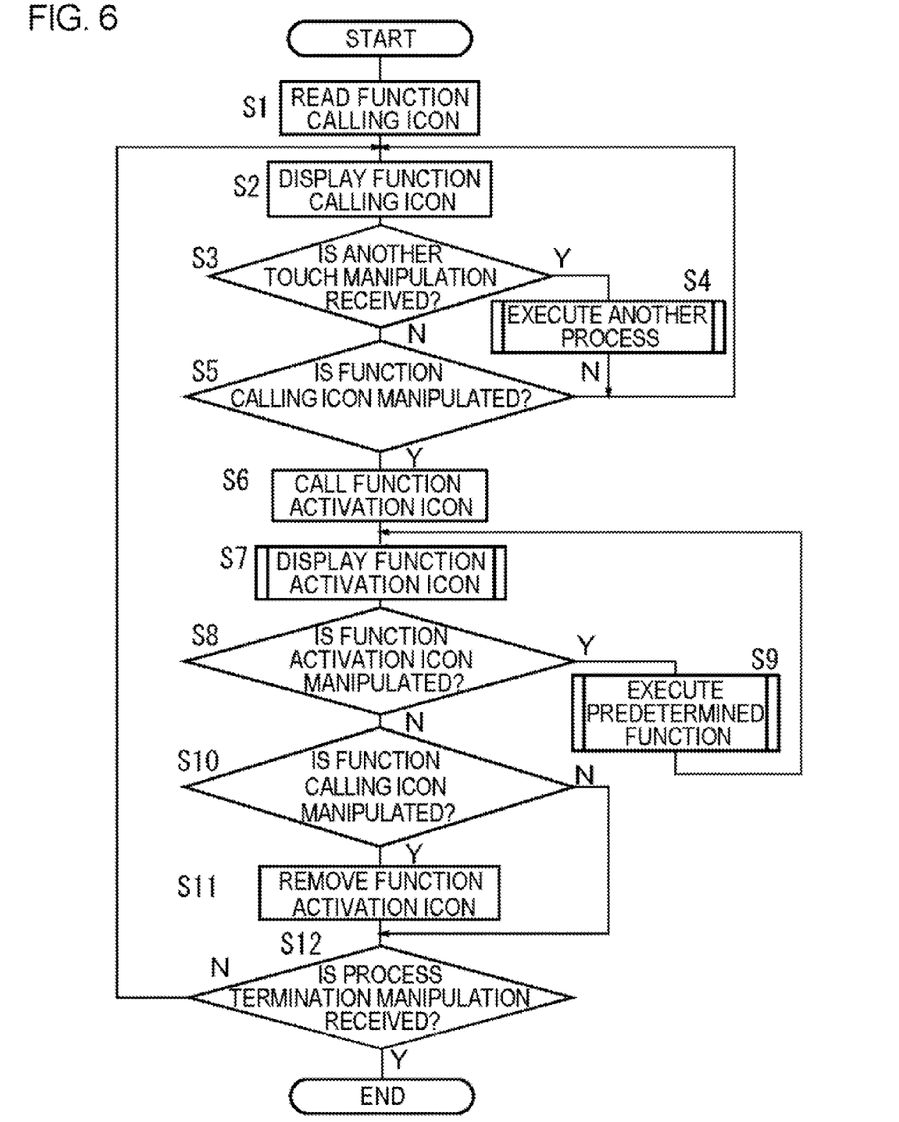
FIG. 6 is a flowchart showing a data processing method by the data processing device.
Figure 7:
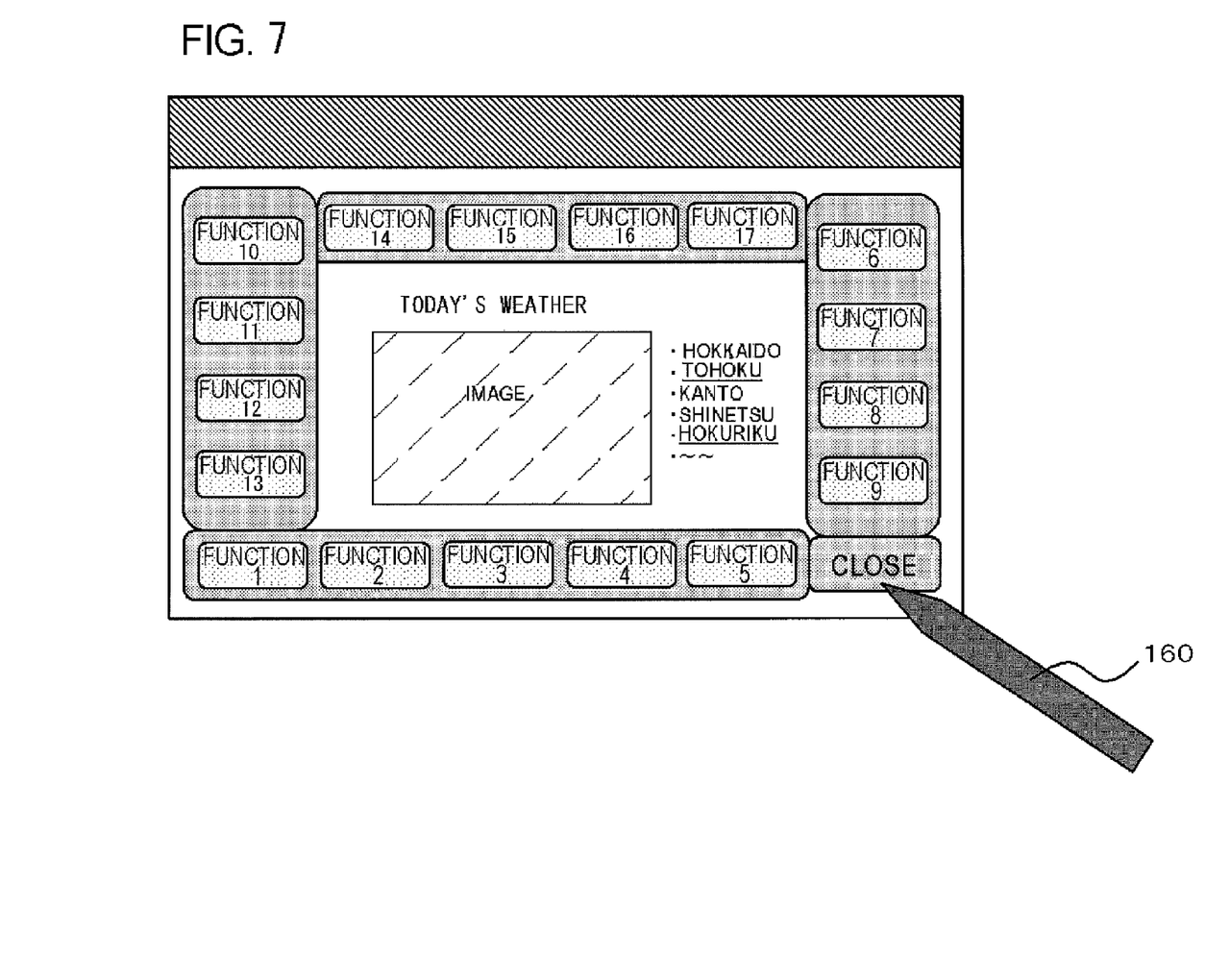
FIG. 7 is a schematic front view showing a state where the images of the plurality of function activation icons are displayed on the screen of the touch panel.
Figure 8:
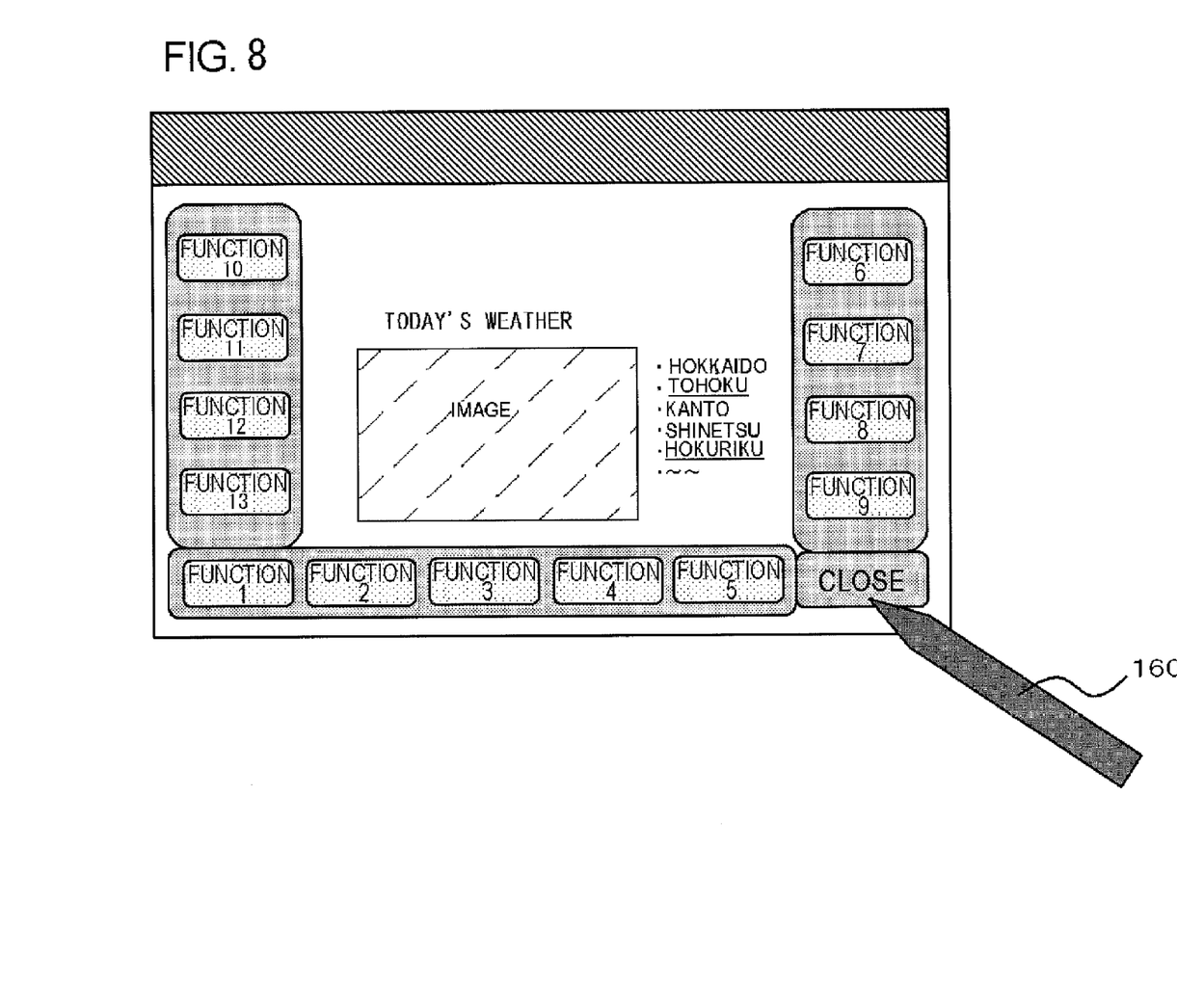
FIG. 8 is a schematic front view showing a state where the images of the plurality of function activation icons are displayed on the screen of the touch panel.

In the configuration described above, the data processing device 100 of the present embodiment is formed in a mobile type as described above. Thus, when a user (not shown) starts the data processing device 100 that the user carries, as shown in FIG. 6, the function calling icon FCI is read (step S1) and is displayed as an image at the bottom right corner which is one of the four corners of the screen 111 of the touch panel 110 as shown in FIG. 2 (step S2).

The function calling icon FCI displayed as an image as described above is displayed, for example, as an image like "TOOL" or the like as shown in the drawing, and is spontaneously understood by the user that the function activation icons FAI of various kinds of tools can be called.

In this state, approximately the entire area of the screen 111 of the touch panel 110 is left blank, and an operation of displaying images and a touch manipulation can be executed. Thus, when the user executes various touch manipulations, for example, (step S3-Y) using a portion where no image of the function calling icon FCI is displayed, various processes such as an image display operation are executed as shown in FIG. 2 (step S4).

In this state, approximately the entire area of the screen 111 of the touch panel 110 is used for various processes. In such a state, when the user wants to use a specific function executed by the function activation icon FAI, for example, as shown in FIG. 3, the user touches on the function calling icon FCI on the bottom right corner of the screen 111 of the touch panel 110 (step S5-Y).

Then, a plurality of function activation icons FAI set in advance is called (step S6), and as shown in FIG. 4, the images thereof are displayed and arranged on the upper and left sides of the function calling icon FCI (step S7).

In this case, the screen 111 of the touch panel 110 which is used for displaying of the images or the like associated with various processes as described above is also used for displaying of the images of the plurality of function activation icons FAI as described above.

However, as described above, the images of the plurality of function activation icons FAI are displayed and arranged on the right and bottom sides of the screen 111 of the touch panel 110. Thus, approximately the entire area of the screen 111 of the touch panel 110 can be used for displaying of the images associated with various processes, and substantially no displayed image is obstructed.

In such a state, when the image of the displayed function activation icon FAI is touched (step S8-Y), a specific function corresponding to the icon is executed (step S9). Such a touch manipulation is executed by a finger as well as the stylus 160 described above.

As described above, in a state where the images of the function activation icons FAI are displayed, as shown in the drawing, the function calling icon FCI is displayed, for example, as an image like "CLOSE" or the like, and is spontaneously understood by the user that the function activation icon FAI can be removed.

Thus, as described above, when the user who has touched on the function activation icon FAI to use various functions touches again on the function calling icon FCI as shown in FIG. 5 (step S10-Y), the plurality of function activation icons FAI displayed as images as described above are removed as shown in FIG. 2 (step S11).

Thus, a state where approximately the entire area of the screen 111 of the touch panel 110 is used again for various processes is created. Accordingly, the entire part of a display image which has been obstructed by the function activation icons FAI, for example, is displayed again.

In this way, the function calling icon FCI and the function activation icons FAI return to an initial state. Thus, the process operations as described above can be repeatedly performed until the data processing device 100 is turned off, for example, by a predetermined operation (step S12-Y).

In the data processing device 100 of the present embodiment, as described above, the icon storage unit 120 stores a plurality of function activation icons FAI each for activating a predetermined function by the touch manipulation and a function calling icon FCI for calling the plurality of function activation icons by the touch manipulation.

The calling and display unit 130 displays the image of the function calling icon FCI stored in this way on at least one of the four corners of the screen 111 of the touch panel 110. The icon calling unit 140 calls a plurality of function activation icons FAI in correspondence to the touch manipulation on the function calling icon FCI displayed as an image as described above.

The function display unit 150 displays the images of the plurality of called function activation icons FAI so as to be arranged on at least one of the four sides of the screen 111, which communicates with one of the four corners where the function calling icon FCI is located.

Thus, it is possible to minimize the proportion in which the images of the plurality of displayed function activation icons FAI obstruct the display image displayed on the screen 111. Therefore, the user can use various functions with the plurality of function activation icons FAI while utilizing approximately the entire area of the screen 111 of the touch panel 100.

In particular, the function display unit 150 displays the images of the plurality of function activation icons FAI so as to be arranged on two of the four sides which communicate with one of the four corners where the function calling icon FCI is located. Thus, the plurality of function activation icons FAI are displayed so as to be arranged on the two sides of the screen 111 of the rectangle of the touch panel 110.

Thus, a remaining portion in a state where the images of the function activation icons FAI are displayed can be made to be rectangular similarly to that before the images are displayed. Therefore, a display image may be displayed approximately in the entire area of the rectangle of the screen 111, and the display image may be reduced and displayed in a remaining portion of the rectangle of the screen 111 when the plurality of function activation icons FAI are arranged and displayed on the four sides (not shown).

In addition, the icon storage unit 120 stores the function calling icon FCI which is displayed as an image in a predetermined vertical height and horizontal width. The function display unit 150 displays the images of the plurality of function activation icons FAI so as to be arranged on one of the four sides which communicates in a vertical direction with the same horizontal width as the function calling icon FCI with one of the four corners where the function calling icon FCI is located, and displays the images of the plurality of function activation icons FAI so as to be arranged on one of the four sides which communicates in a horizontal direction with the same vertical height as the function calling icon FCI.

Therefore, in a state where the function activation icons FAI are not displayed, the user can spontaneously predict a region where the images of the function activation icons FAI are displayed. Thus, when displaying the images of the function activation icons FAI, as shown in FIGS. 3 and 4, it is possible to arrange the display image associated with various processes in advance at a position such that the display image is not obstructed even when the images of the function activation icons FAI are displayed.

In addition, the display image of the function calling icon FCI is changed before and after the images of the function activation icons FAI are displayed. More specifically, since the function calling icon FCI is displayed as an image like "TOOL" or the like as shown in FIGS. 2 and 3 before the images of the function activation icons FAI are displayed, the user can spontaneously understand that the function activation icons FAI of various tools can be called.

On the other hand, since the function calling icon FCI is displayed as an image like "CLOSE" or the like as shown in FIGS. 4 and 5 after the images of the function activation icons FAI are displayed, the user can spontaneously understand that the function activation icons FAI can be removed.

The present invention is not limited to the present embodiment, but various modifications can be made within the range without departing from the scope and spirit thereof. For example, in the above embodiment, although the data processing device 100 is illustrated as being formed in a mobile type, the present invention can be implemented in a non-mobile type data processing device 100.

Moreover, in the above embodiment, the image of the function calling icon FCI is illustrated as being displayed on one of the four corners of the screen 111 of the rectangle of the touch panel 110. However, the images of a plurality of function calling icons FCI may be individually displayed on plural corners of the four corners of the screen 11 of the touch panel 110.

In addition, in the above embodiment, the images of the plurality of function activation icons FAI are illustrated as being displayed so as to be arranged on two of the four sides, which communicate with one of the four corners where the function calling icon FCI is located.

However, the images of the plurality of function activation icons FAI may be displayed so as to be arranged on only one of the four sides, which communicates with one of the four corners where the function calling icon FCI is located (not shown).

Moreover, the images of the plurality of function activation icons FAI may be displayed so as to be arranged on one of the four sides, which communicates with another one of the two of the four sides, where the images of the plurality of function activation icons FAI are displayed and arranged.

In this case, the images of the plurality of function activation icons FAI are displayed so as to be arranged on three continuous sides of the screen 111, which are generally C or U shaped (not shown).

In addition, in the present embodiment, the respective units of the data processing device 100 are illustrated as being logically realized as various functions by a computer program. However, these respective units may be formed as unique hardware and may be realized as a combination of software and hardware.

It goes without saying that the embodiment and the plurality of modifications described above can be combined with each other unless contrary to the content thereof. Moreover, in the embodiment and modifications described above, although the structure and the like of the respective units have been described concretely, the structure and the like may be changed in various ways within the range of the present invention.

This application is based upon and claims the benefit of priority from Japanese Patent Application No. 2009-096979 filed on Apr. 13, 2009, the entire contents of which are incorporated herein by reference.

The invention claimed is:

1. A data processing device comprising:
    a touch panel that includes a rectangular screen which has a function of displaying images and a function of accepting a touch manipulation;
    an icon storage unit that stores a plurality of function activation icons each for activating a predetermined function by the touch manipulation and a function calling icon for calling the plurality of function activation icons by the touch manipulation;
    a call display unit that displays an image of the stored function calling icon on at least one of four corners of the screen of the touch panel;
    a function calling unit that calls the plurality of function activation icons in correspondence to the touch manipulation on the image of the displayed function calling icon; and
    a function display unit that displays at least two rows of images of the plurality of called function activation icons on the screen,
    wherein the first row called by the touch manipulation to a first function calling icon extends from the first function calling icon, which is located at one of the four corners, along a first side of the screen,
    wherein the second row called by the touch manipulation to the first function calling icon extends from the first function calling icon along a second side of the screen,
    wherein a display image of the first function calling icon is changed before and after images of the function activation icons are displayed.

2. The data processing device according to claim 1, wherein the function display unit displays the images of the plurality of function activation icons on at least two of the four sides such that the row extends from the function calling icon located in the corner of the four corners in which the function calling icon is located.

3. The data processing device according to claim 2,
    wherein the icon storage unit stores the function calling icon which is displayed as an image in a predetermined vertical height and horizontal width, and
    wherein the function display unit displays the images of the plurality of function activation icons so as to be arranged on one of the four sides, which communicates in a vertical direction with the same horizontal width as the function calling icon with one of the four corners where the function calling icon is located, and displays the images of the plurality of function activation icons on one of the four sides such that the row extends from the function calling icon located in the corner of the four corners in which the function calling icon is located.

4. The data processing device according to claim 1, wherein the function display unit displays the images of the plurality of function activation icons on one of the four sides such that the row extends from the function calling icon located in the corner of the four corners in which the function calling icon is located.

5. The data processing device according to claim 1, wherein the icon storage unit stores the function calling icon of which the display image is changed before and after the images of the function activation icons are displayed.

6. The data processing device according to claim 1, further comprising:
    an image display unit that displays a display image in the entire area of the rectangular screen; and
    a reduction display unit that reduces and displays the display image in a remaining portion of the rectangular screen when the plurality of function activation icons are arranged and displayed on the four sides.

7. The data processing device according to claim 1, wherein the call display unit and the function display unit display the image of the function calling icon and the images of the function activation icons so that a remaining portion on the rectangular screen in which the image of the function calling icon and the images of the function activation icons are not displayed is rectangular.

8. The data processing device according to claim 7, further comprising:
    a reduction display unit that reduces a display image to be displayed in the entire area of the rectangular screen so that a reduced image has an aspect ratio identical to an aspect ratio of the display image, and that displays the reduced image in the remaining portion.

9. The data processing device according to claim 1, wherein the display image of the first function calling icon after the images of the function activation icons are displayed is changed to include information that the function activation icons are removable by a touch manipulation of the first function calling icon.

10. A non-transitory information storage medium storing a computer program of a data processing device, for causing the data processing device to execute:
    an icon storage process of storing a plurality of function activation icons each for activating a predetermined function by the touch manipulation and a function calling icon for calling the plurality of function activation icons by the touch manipulation;
    a call display process of displaying the image of the stored function calling icon on at least one of the four corners of the screen of the touch panel;
    a function calling process of calling the plurality of function activation icons in correspondence to a touch manipulation on the image of the displayed function calling icon; and
    a function display process of displaying at least two rows of the images of the plurality of called function activation icons on the screen,
    wherein the first row called by the touch manipulation to a first function calling icon extends from the first function calling icon, which is located at one of the four corners, along a first side of the screen,
    wherein the second row called by the touch manipulation to the first function calling icon extends from the first calling function icon along a second side of the screen,
    wherein a display image of the first function calling icon is changed before and after images of the function activation icons are displayed.

11. A data processing method of a data processing device, comprising:
    an icon storage operation of storing a plurality of function activation icons each for activating a predetermined function by the touch manipulation and a function calling icon for calling the plurality of function activation icons by the touch manipulation;
    a call display operation of displaying the image of the stored function calling icon on at least one of the four corners of the screen of the touch panel;
    a function calling operation of calling the plurality of function activation icons in correspondence to a touch manipulation on the image of the displayed function calling icon; and
    a function display operation of displaying at least two rows of the images of the plurality of called function activation icons on the screen, wherein the first row called by the touch manipulation to a first function calling icon extends from the first function calling icon, which is located at one of the four corners, along a first side of the screen, wherein the second row called by the touch manipulation to the first function calling icon extends from the first calling function icon along a second side of the screen, wherein a display image of the first function calling icon is changed before and after images of the function activation icons are displayed.

* * * * *